United States Patent Office 3,539,856
Patented Nov. 10, 1970

3,539,856
ROTARY ELECTRIC MACHINES
Brian James McCormick, Ilford, Essex, England, assignor to The Plessey Company Limited, Ilford, England, a British company
Filed Aug. 20, 1968, Ser. No. 753,912
Int. Cl. H02k 1/22
U.S. Cl. 310—266                          3 Claims

ABSTRACT OF THE DISCLOSURE

A stepping motor affording a high torque to inertia ratio comprises a hollow cylindrical rotor press pierced through its cylindrical surface to define equiangularly spaced rotor poles, the rotor being coaxially interposed between—and rotatable with respect to—an annular coil structure and a pole structure having the same number of permanently magnetized poles as the rotor.

---

This invention relates to rotary electric motors.

The present invention seeks to provide a self-starting electric motor having a high torque to inertia ratio which starts in a preferred direction.

According to the present invention a self-starting electric motor comprises a winding, a magnetic pole structure with respect to which the winding is coaxially positioned, a number of alternate north and south poles on said magnetic pole structure, and a hollow cylindrical magnetic rotor of soft magnetic material interposed coaxially between the said winding and the said pole structure and having defined in its cylindrical surface the same number of rotor poles as the pole structure, the rotor poles or the poles of the pole structure being asymmetrical about the radii of the rotor through their centres to give a preferred direction of rotation responsively to the application to the winding of alternating current or unidirectional pulses of current at any frequency below a predetermined limit frequency and arranged in such a manner that in the absence of current in the winding the rotor poles are angularly offset with respect to the poles of the pole structure.

The pole structure may include a permanent magnet having the alternate north and south poles impressed magnetically around its periphery and the said pole structure may be encircled by the hollow cylindrical rotor.

Preferably it is the rotor poles which are asymmetrical about the radii of the rotor through their centres and they are defined between generally triangular cut-outs spaced equiangularly around the cylindrical surface of the rotor.

Figure 1:
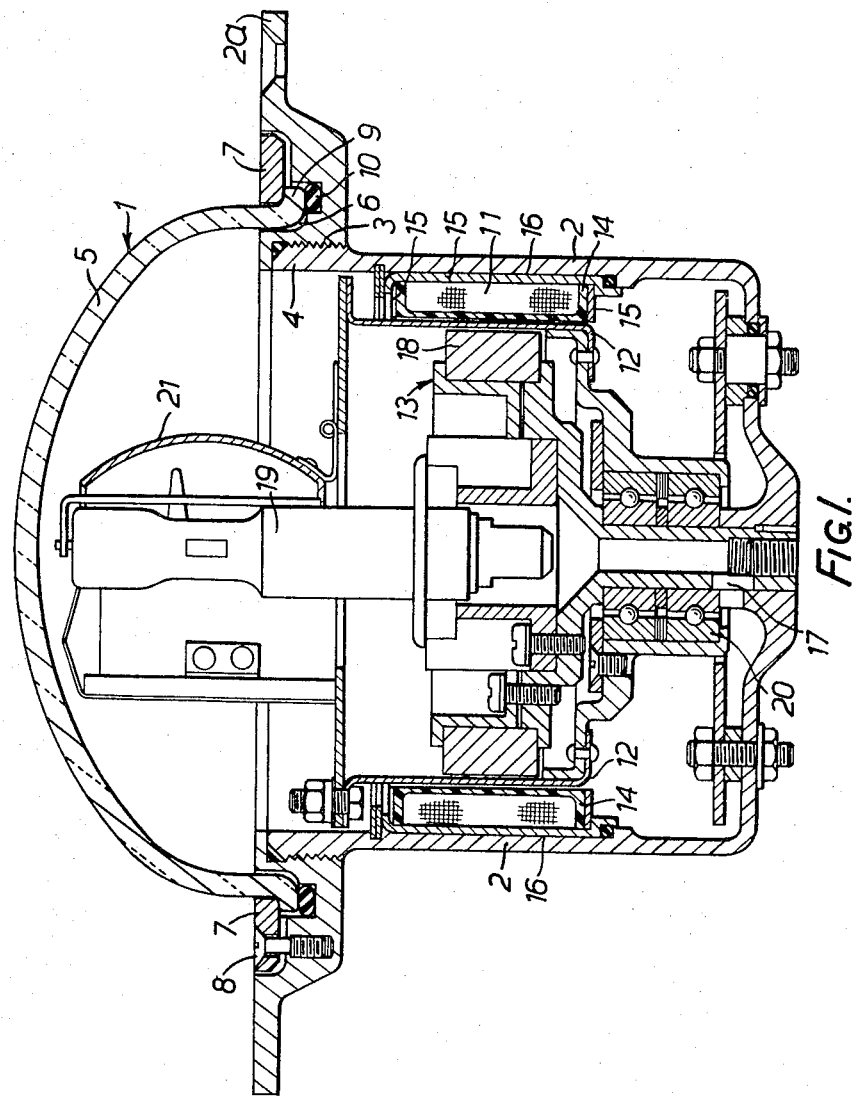
Figure 2:
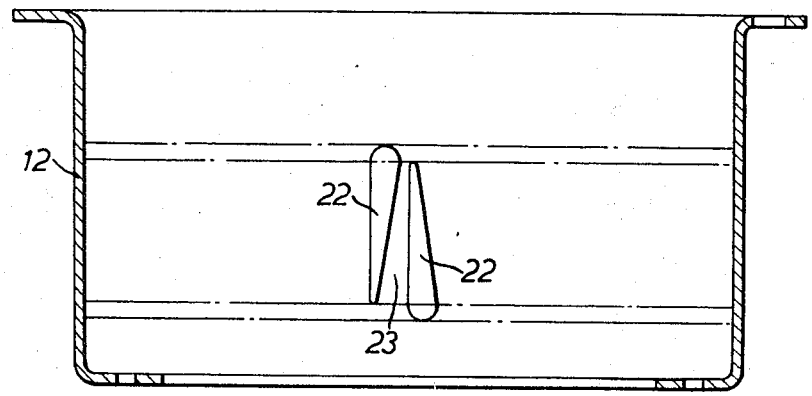

An exemplary embodiment of the invention will now be described with reference to the accompanying drawings in which, FIG. 1 is a sectional view of a flasher beacon which embodies a motor according to one aspect of this invention; and FIG. 2 is a sectional view of a rotor which forms part of the motor of FIG. 1.

Referring to FIG. 1 a flasher beacon 1 comprises a motor according to the invention which drives a reflector around a light source thereby to provide a light beam which when viewed from a fixed position relative to the beacon appears to be interrupted at regular intervals. The beacon 1 comprises a generally bell-shaped housing 2 including an annular cap 2a having a female screw threaded portion 3 which co-operates with a complementayr male screw threaded portion 4 on the open end of the bell-shaped housing 2. A bell glass 5 is retained in a circular groove 6 of the ring cap by means of retaining ring 7 clamped to the annular cap 2a by means of screws (one of which is shown at 8) so as to urge a lip 9 of the bell glass 5 against a sealing gasket 10 positioned in the bottom of the groove 6. The motor according to the invention is fitted inside the housing and comprises a coil 11 which encircles coaxially a hollow cylindrical rotor 12 the rotor being arranged to encircle coaxially a permanent magnet structure 13. The coil 11 is wound on a bobbin 14 embraced around its two end faces and its outer cylindrical surface by soft iron parts 15 of a yoke which completes the magnetic circuit and by means of which the bobbin is secured to the inner walls 16 of the housing 2. The permanent magnet structure 13 is fixed to a pillar 17 which extends along the motor axis from the centre of the inner closed end face of the housing. The structure 13 which includes an annular permanent magnet 18 which has magnetically impressed around its cylindrical surface alternate north and south poles. A lamp holder assembly 19 is secured to the end of the pillar remote from the inner closed end face of the housing so as to extend through the annular magnet, along the axis of the motor and project into the bell glass 5. The hollow cylindrical magnetic rotor 12 is mounted on a bearing 20 fitted to the pillar between the lampholder assembly and the inner closed end face of the housing and extends into the housing between the annular magnet 18 and the coil bobbin 14, that end of the rotor extending between the bobbin 14 and the magnet 18 and remote from the said end face of the housing being bent outwardly to form a flange to which is secured a reflector assembly 21. As shown in FIG. 2 the rotor 12 includes press pierced generally triangular cutouts 22 (only two of which are shown) so as to define in its cylindrical surface a number of equiangularly spaced rotor poles 23 of generally triangular shape which are asymmetrical about the radii of the rotor through their centres. The permanent magnet 18 has the same number of poles as the rotor. When the coil 11 is not energized the rotor 12 tends to assume a position with the rotor poles displaced from alignment with the poles of the permanent magnet 18. In this position the reluctance of a magnetic circuit path which extends from the permanent magnet poles through the rotor 12, around the soft iron path of the yoke parts 15 and back to the permanent magnet poles is a minimum. If the coil 11 is energized by a current pulse in one sense the rotor experiences a torque and is constrained to move one pole pitch. If the coil 11 is then energized by a current pulse in the opposite sense, the rotor 12 moves again one pole pitch in the same direction. The asymmetry of the rotor poles ensures that the motor rotates in a predetermined direction when pulses having a low repetition frequency are applied to the coil. Thus when the coil 11 is supplied with alternating current at relatively low frequency the motor operates as a stepping motor in a predetermined direction and if for example the motor has ten pairs of poles and they are supplied with alternating current of 50 cycles per second it will operate at 600 revs. per minute.

The mass of the hollow rotor 12 as compared with solid rotors utilized on some other machines, is small and therefore in operation the forces of inertia are correspondingly small. This feature enables the motor to be operated at relatively high frequencies as a stepping motor. Nevertheless, at certain frequencies (depending on the particular design) the forces of inertia are such that the rotor no longer turns in discrete incremental steps, but the motor operates as a self-starting synchronous motor, which will not start in any predetermined direction. Therefore if the motor is operated in this mode, and it is desirable that the motor should turn in a predetermined direction means must be provided whereby the motor will only operate in one direction. These means may consist of a ratchet or spring device on a rotor shaft which permits rotation of the shaft in one direction only. The self-starting facility afforded by the asymmetry of the rotor poles is not effective above a predetermined limit frequency determined in acordance with the particular design and thus when the motor is required to operate above this limit frequency an alternative means for starting is provided and comprises a resilient part, of rubber for example, through which the pole structure is secured. This enables the pole structure to turn fractionally in response to an initial pulse applied to the winding thereby to facilitate starting.

The coil may be centre tapped such that unidirectional pulses of current may be supplied to respective paths of the coil so as to produce an alternating field. The coil may also be bifilar wound provided that the current pulses applied to it are such as to produce an alternating field.

What I claim is:

1. A self-starting electric motor, comprising
    a housing (2);
    stator means connected with said housing and including an annular permanent magnet (18), and yoke means including an annular winding (11) arranged in concentric spaced relation relative to said annular permanent magnet, said permanent magnet having magnetically impressed about its periphery a succession of poles of alternate polarity; and
    hollow cylindrical rotor means (12) journalled in said housing for rotation relative to said stator means, said rotor means including a thin cylindrical wall portion arranged concentrically between and spaced from said annular permanent magnet and said annular winding, said cylindrical wall portion containing opposite said annular permanent magnet a plurality of circumferentially spaced triangular cut-outs (22) the number of which equals the number of poles of said annular permanent magnet, the apices of alternate ones of said cut-outs being directed toward opposite ends of said rotor, respectively, to define between said cut-outs rotor poles (23) that are asymmetrical relative to the radii of the rotor through their centres, whereby when the annular winding is de-energized, the rotor assumes a position in which the rotor poles are angularly offset relative to the stator poles, and upon energization of the winding, torque is applied to the rotor to effect displacement of the rotor relative to the stator.

2. Apparatus as defined in claim 1, wherein each of said triangular cut-outs extends generally longitudinally of the rotor.

3. Apparatus as defined in claim 1, and further including means resiliently connecting said permanent magnet with said housing to facilitate starting when said winding is energized with an alternating current voltage the frequency of which exceeds a predetermined limit frequency.

References Cited

UNITED STATES PATENTS

| | | | |
|---|---|---|---|
| 1,167,366 | 1/1916 | Fessenden | 310—169 |
| 1,982,315 | 11/1934 | Lundberg | 310—66 |
| 2,789,673 | 4/1957 | Tetro | 310—41 |
| 2,952,788 | 9/1960 | Volkerling | 310—266 |
| 2,985,778 | 5/1961 | Fritz | 310—41 |
| 2,996,607 | 8/1961 | Witt | 240—49 |
| 3,308,315 | 3/1967 | Mahon | 310—41 |
| 3,348,083 | 10/1967 | Inariba | 310—154 |
| 3,165,684 | 1/1965 | Ensink | 318—138 |

MILTON O. HIRSHFIELD, Primary Examiner

R. SKUDY, Assistant Examiner

U.S. Cl. X.R.

310—66, 154